(12) United States Patent
Kimmich et al.

(10) Patent No.: US 10,457,351 B2
(45) Date of Patent: Oct. 29, 2019

(54) DRIVE SYSTEM FOR A PEDAL-OPERABLE VEHICLE AND METHOD FOR SENSING THE STATE OF A PEDAL DRIVE

(71) Applicant: Robert Bosch GmbH, Stuttgart (DE)

(72) Inventors: Peter Kimmich, Steinenbronn (DE); Wolfram Schock, Ohmenhausen (DE)

(73) Assignee: Robert Bosch GMBH, Stuttgart (DE)

( * ) Notice: Subject to any disclaimer, the term of this patent is extended or adjusted under 35 U.S.C. 154(b) by 253 days.

(21) Appl. No.: 15/110,375

(22) PCT Filed: Nov. 17, 2014

(86) PCT No.: PCT/EP2014/074744
§ 371 (c)(1),
(2) Date: Jul. 7, 2016

(87) PCT Pub. No.: WO2015/104081
PCT Pub. Date: Jul. 16, 2015

(65) Prior Publication Data
US 2016/0332695 A1 Nov. 17, 2016

(30) Foreign Application Priority Data

Jan. 9, 2014 (DE) .................. 10 2014 200 173

(51) Int. Cl.
*B62M 6/50* (2010.01)
*B62M 6/55* (2010.01)

(52) U.S. Cl.
CPC ............ *B62M 6/50* (2013.01); *B62M 6/55* (2013.01)

(58) Field of Classification Search
CPC ................................. B62M 6/50; B62M 6/55
See application file for complete search history.

(56) References Cited

U.S. PATENT DOCUMENTS

2011/0183794 A1* 7/2011 Chan .................. B62M 6/55
474/70

FOREIGN PATENT DOCUMENTS

DE 19617959 10/1997
DE 29721371 U1 2/1998
(Continued)

OTHER PUBLICATIONS

Machine translation of JP 9-290795, Nov. 1997.*
(Continued)

*Primary Examiner* — Kevin Hurley
(74) *Attorney, Agent, or Firm* — Norton Rose Fulbright US LLP; Gerard Messina (57) ABSTRACT

A drive system for a pedal-operable vehicle, including a drive motor, pedals on pedal arms, a bottom bracket spindle on which the pedal arms are mounted, and a drive mechanism for transferring drive energy. A clearance is present in a transfer path between a pedal arm and a drive wheel, rotating with the bottom bracket spindle, of the drive mechanism. The system includes a return device with which the clearance-affected parts are transferable, at or below an idle pedal force within their clearance with respect to one another, into an idle position in which the clearance-affected parts assume a predefined relative position; the clearance-affected parts being removable, within the clearance, from the idle position by way of pedal force above the idle pedal force against the action of the return device; and information as to whether the clearance-affected parts are in an idle position being furnishable as electrical signals.

9 Claims, 5 Drawing Sheets

(56) References Cited

FOREIGN PATENT DOCUMENTS

| DE | 102012110617 | 5/2013 |
|----|--------------|--------|
| EP | 0935128 | 8/1999 |
| EP | 2578484 A1 | 4/2013 |
| FR | 2768991 | 4/1999 |
| JP | 04358988 | 12/1992 |
| JP | H09290795 | 11/1997 |
| JP | 10324290 | 12/1998 |
| JP | 11049078 | 2/1999 |
| JP | 1159557 | 3/1999 |
| WO | WO 2013/041900 | 3/2013 |

OTHER PUBLICATIONS

International Search Report dated Feb. 10, 2015, of the corresponding International Application PCT/EP2014/074744, filed on Nov. 17, 2014.

\* cited by examiner

DRIVE SYSTEM FOR A PEDAL-OPERABLE VEHICLE AND METHOD FOR SENSING THE STATE OF A PEDAL DRIVE

FIELD

The present invention relates to a drive system for a pedal-operable vehicle, in particular an electric bicycle, having a drive motor with which a drive force for the vehicle is generatable, having pedals on cranks, having a bottom bracket spindle on which the cranks are mounted, and having a drive mechanism for transferring drive energy from the bottom bracket spindle to a wheel of the vehicle. The present invention furthermore relates to a method for detecting a drive state of a pedal drive of a pedal-operable vehicle having an electric drive system.

BACKGROUND INFORMATION

Electric bicycles that are equipped with an electric drive motor using the conventional, advantageous central motor concept are available. This concept offers, for example, a balanced weight distribution as well as further advantages. Electric bicycles of this kind can be operated both with muscle power and with additional electrical drive energy. Because the muscle-power-operated pedal drive in typical vehicles is not required continuously, the rider of an electric bicycle of this kind stops pedaling, for example, when coasting or going downhill. Situations can occur in which the rider furthermore removes his or her feet from the pedals. It is then disadvantageous if the pedals on the cranks rotate in a manner induced by the motion of the bicycle; this is referred to as "ghost pedaling." In some variants of electric bicycles, the cranks are mechanically coupled or couplable to the drive motor so that upon generation of a drive force from the drive motor the pedals on the cranks also rotate; this is referred to as "self-pedaling." Electric bicycles whose bottom brackets are equipped with speed sensors and torque sensors, or a combination of the two, are available in order to prevent these situations. In an electric bicycle having a wheel hub motor, the tension of the chain of the pedal drive can be measured. A rider input can be recognized with such sensors. In the situation mentioned, this input can be, for example, to prevent ghost pedaling or self-pedaling of the pedals. Methods also exist according to which a rider input can be ascertained, based on a model, from signals of an acceleration sensor suite, a rotation angle sensor suite, and a vehicle speed sensor suite.

France Patent No. FR 2 768 991 describes an electric bicycle that, in the context of pushing, generates an electrical drive force when the exertion of a pushing force on the frame of the bicycle is recognized. Japan Patent No. JP 1159 557 proposes an electric bicycle in which the state in which the latter is being pushed can be recognized from the fact that pushing forces are detected at a handgrip on the handlebars at which the bicycle is being pushed. Pushing is assisted by energy from the electric motor of the electric bicycle which is derived from the detected pushing forces. Japan Patent No. JP 11 049 078 proposes an electric bicycle in which the state of pushing the bicycle is detected on the basis of three different conditions, and in the event a pushing state is recognized, pushing is assisted with electrical drive energy. Japan Patent No. JP 04 358 988 describes an electric bicycle with recognition of the pushing state based on three conditions, namely no torque induced by muscle power, a specific speed of the bicycle, and actuation of a switch on a handgrip. Japan Patent No. JP 10 324 290 discloses an electric bicycle that has a switch that can be actuated by pushing on the part of the driver, in order to switch on an electric drive. The switch can be disposed at the rear end of the saddle.

It is not known from the existing art also to prevent ghost pedaling or self-pedaling of the pedals during riding operation of an electric bicycle by detecting a driver input by way of a sensor suite. The methods known in the existing art would also not be suitable for this, since they are made dependent on the decision as to whether an additional electrical force is to be generated, on pushing forces, or on a switch that is to be pressed in the context of pushing.

SUMMARY

In the example drive system according to the present invention, drive energy is transferred via a transfer path from a pedal via a crank to a bottom bracket spindle, and from there to a drive wheel rotating with the bottom bracket spindle. According to the present invention a clearance is present in this drive train. The drive system furthermore encompasses a return device that is configured to bring the mutually clearance-affected parts into an idle position when no drive forces, or low drive forces that are below a idle pedal force, are being transferred. The idle position is a predefined position in which the clearance-affected parts are in relation to one another within their clearance with respect to one another. Above the idle pedal force, the clearance-affected parts can be brought out of the idle position within their clearance with respect to one another. The return device counteracts this operation with a return force or a return torque. According to the present invention, the drive device furnishes information as to whether the clearance-affected parts are in an idle position. This can be furnished preferably in the form of one or more electrical signals. In an exemplifying embodiment the information can be obtained by correlating information from multiple electrical signals. The drive motor is particularly preferably an electric motor. The idle pedal force can be at least approximately zero. The clearance between the clearance-affected parts is in particular an angular or rotational clearance, in particular between the bottom bracket spindle and the drive wheel. In a variant it is also conceivable to provide the clearance between the bottom bracket spindle and one or both cranks, or the like. The drive wheel is typically part of the drive mechanism and can be, for example, a chainring, a belt pulley for a toothed belt, a bevel gear for a shaft drive, or the like. The return device preferably encompasses a spring device that can be embodied in particular as a spring element that generates a return force or a return torque upon deflection out of the idle position. The return force or return torque is preferably proportional to a pedal-induced drive torque or to a pedal force. Particularly preferably the idle position is also recognized when the bottom bracket spindle is rotating. Typically the weights of the two cranks with their pedals cancel each other out, so that they have little or no influence on pedal-force-induced drive torques when the rider takes his or her feet off the pedals. The moment of inertia is not relevant as long as the pedals are rotating at a uniform speed. The idle pedal force can be set to a value greater than zero in order to allow possible changes in pedal rotation speed to be tolerated. The information that the pedal drive is in an idle position can be used to switch off the drive motor in order to prevent ghost pedaling and/or self-pedaling.

In an embodiment of the drive system, upon application of an end stop pedal force or of a pedal-induced end stop torque, the clearance is overcome sufficiently that the clearance-affected parts come into contact at respective end stop regions. In this position the clearance is abolished as long as the end stop pedal force or pedal-induced end stop torque is being applied. The transfer of drive energy is accomplished via end stop regions on each of the two clearance-affected parts. The end stop regions of the clearance-affected parts are in contact in the end stop position, and form at least one common end stop region at the contact point or points. According to this embodiment, information as to whether the clearance-affected parts are in the end stop position can be furnished in the form of one or more electrical signals. The information can be distributed among multiple electrical signals, and the information can be extracted and furnished by associating multiple, in particular two, electrical signals. The information can be used to cause drive energy to be made available to the drive motor when the end stop position exists. The pedal-induced power is then assisted by electrical power.

In a further embodiment of the drive system, what is effected is that the drive motor delivers no drive energy when the clearance-affected parts are in an idle position. The method for recognizing the idle position can require that the bottom bracket spindle have rotated through a certain angle before the idle position can be recognized. This range is intended not to exceed half a revolution of the bottom bracket spindle. In particular, the drive motor delivers no further drive energy at the latest when the bottom bracket spindle has further rotated through half a revolution after the idle position is entered into. Self-pedaling and, if possible, also ghost pedaling of the pedals is intended to be prevented by the shutoff of drive energy.

In a further embodiment of the drive system, recognition of the idle position, of the end stop position, or of an intermediate position between the two aforesaid positions is possible while the bottom bracket spindle is rotating. Provided for this purpose is a detection device that does not rotate with the bottom bracket spindle but instead, for example, is disposed in frame-mounted fashion. The detection device detects a passage time or a passage angle of at least two passage indicator devices that respectively rotate with one of the clearance-affected parts. A time interval detected from the passage times or passage angles, or a detected angular distance between the two passage indicator devices, corresponds to a relative position of the clearance-affected parts with respect to one another. In the context of detection of the time interval between the passage times, the relationship between the relative position of the clearance-affected parts and the time interval of the passages also depends on the rotation speed at which the bottom bracket spindle is rotating. The rotation speed of the bottom bracket spindle is therefore preferably also measured, for example, by identifying by way of the passage indicator device when the same passage indicator device passes by the detection device again. It is also conceivable to detect the rotation speed by detecting the passage of multiple passage indicator devices on one of the two clearance-affected parts which are at a known angular distance from one another, and to make the rotation speed information available from the time interval between their passages. The rotation speed can thereby be detected within a fraction of a full revolution of the bottom bracket spindle. A faster determination of the relative position of the clearance-affected parts with respect to one another, and correspondingly a faster reaction thereto, are thus possible. A "passage" is understood as the transiting of a passage indicator device past the detection device. The detected time interval between a passage of a passage indicator device of one of the clearance-affected parts and the passage of a passage indicator device of another of the clearance-affected parts can be compared with a reference value.

The reference value can depend on the rotation speed of the bottom bracket spindle. The reference value can also be a time interval between passages of two passage indicator devices, at least one of which is different from that one of the passage indicator devices with which the time interval to be compared was generated. Alternatively, the aforesaid time interval between the passages can be scaled, before the comparison with a reference value, with the rotation speed of the bottom bracket spindle. It is also possible to store the time interval between the passages of two passage indicator devices on different ones of the two clearance-affected parts, and to compare it at a later point in time with further detected time differences. A change in the position of the clearance-affected parts with respect to one another can be tracked in this fashion. Alternatively to detecting the time interval, in the context of detection of an angular distance the rotation angle of the bottom bracket spindle or of the drive wheel upon a passage of a passage indicator device is detected. This can be accomplished, for example, by way of an angle measurement device in interaction with the detection device. The detection device can operate, for example, magnetically, capacitively, optically, or acoustically, or can use further suitable detection methods. The direction of action of the measurement device can be oriented axially or radially with respect to the bottom bracket spindle, or can be located in an angular region therebetween. The passage indicator devices are disposed on or in their clearance-affected part in such a way that they interact with the detection device.

In a further embodiment of the drive system, one of the clearance-affected parts has two passage indicator devices that are both associated, with reference to the determination of time intervals or angular distances, with one passage indicator device that belongs to the other clearance-affected part. The three aforesaid passage indicator devices are in particular associated spatially with one another, and in particular are disposed in the vicinity of one another. Two time intervals, between the passages of the two passage indicator devices on the one of the two clearance-affected parts respectively with reference to the passage of the passage indicator device on the other of the clearance-affected parts, can thus be ascertained. Upon a change in the relative position of the clearance-affected parts with respect to one another, one of these time intervals increases while the other decreases. This makes possible an accurate measurement as well as redundancy, which makes the drive system more reliable and less susceptible to malfunction. The two time intervals furthermore enable derivation of information from a comparison of those two time intervals, which information can be associated with the existence of the idle position. The passage indicator devices described above and associated with one another are referred to as a "set of passage indicator devices." A set of passage indicator devices of this kind makes it possible to ascertain, based on the difference in the time intervals between the passages of the passage indicator devices, the relative position of the clearance-affected parts with respect to one another. Sets of passage indicator devices that respectively have only one passage indicator device on each of the clearance-affected parts can be similar in function. It is then not possible to calculate a difference between time intervals within a set of passage indicator devices, and instead only one time interval can be evaluated.

In a further embodiment the time intervals recited with reference to the embodiment just described above are at least approximately of the same size when the clearance-affected parts are in the idle position with respect to one another. Alternatively or concurrently, a first angular distance between a first of the two passage indicator devices on one of the clearance-affected parts and the associated passage indicator device on the other of the clearance-affected parts, and a second angular distance between the second of the two passage indicator devices of the one of the clearance-affected parts and the same associated passage indicator device of the other clearance-affected part can be at least approximately of the same size in the idle position. Alternatively or additionally, the idle position can be in a center position in the clearance between the clearance-affected parts. The aforesaid features are advantageous because in this fashion the clearance makes possible a deflection of the same size in both of the conceivable motion directions within the clearance.

In a further embodiment, it is proposed to equip the clearance-affected parts with more than one set of passage indicator devices. The angular distances of these sets of passage indicator devices can be respectively of the same size with respect to one another. A uniform passage of the sets of passage indicator devices past the detection device then results, with the result that the rotation speed of the bottom bracket spindle is detectable at regular intervals. In particular, four passage indicator devices are provided on one of the clearance-affected parts and eight on the other of the clearance-affected parts. The spacing between passage indicator devices within a set of passage indicator devices is preferably considerably smaller than the spacing between two sets of passage indicator devices. This makes possible an accurate measurement of the rotation speed of the bottom bracket spindle, since it can be based on a longer measured time between passages of passage indicator devices of two different sets of passage indicator devices. Alternatively, sets of passage indicator devices can be embodied with a small spacing between one another in order to provide as many such sets as possible. It is then possible to detect the idle position, an intermediate position, or an end stop position over a small angular range of the rotation of the bottom bracket spindle. It is furthermore possible to dispose sets made up of two passage indicator devices behind one another, so that the passage indicator devices on the one of the clearance-affected parts alternate with passage indicator devices of the other of the clearance-affected parts. The number of measurements of time intervals between the passages of passage indicator devices of different ones of the clearance-affected parts can thereby be maximized. A very small portion of one revolution of the bottom bracket spindle is thus required in order to ascertain a relative position of the clearance-affected parts with respect to one another. The change in the relative position can be ascertained by comparing time intervals of successive passing sets of passage indicator devices.

Particularly preferably, both cranks are mounted on the bottom bracket spindle, and transfer pedal-induced torque into it. In particular, none of the cranks is connected to a drive wheel of the drive mechanism. All of the torque generated via the pedals is thus introduced into the bottom bracket spindle and can be detected at the transition to the drive wheel using a torque detection device. This is preferred for all embodiments.

In a further aspect of the present invention, a method for detecting a drive state of a rotational speed drive of a pedal-operable vehicle is provided. The vehicle has a drive system that has two clearance-affected parts that can assume a position relative to one another within the clearance, a detection device for the passage of passage indicator devices, at least one passage sensor device being disposed on each of the clearance-affected parts. The drive system furthermore preferably has an ascertaining device with which the relative position of the clearance-affected parts can be ascertained from signals of the detection device. The ascertaining device can also be embodied and/or disposed externally to the drive system. In the method, a relative position of the clearance-affected parts is detectable with the detection device by the fact that the time interval between a passage of a passage indicator device on one of the clearance-affected parts and a passage of the passage indicator device on the other of the clearance-affected parts is ascertained. The passage indicator devices respectively pass by the detection device. It is possible in particular to detect whether the clearance-affected parts are in the idle position, the end stop position, or an intermediate position with respect to one another. Deflection into an intermediate position from the idle position preferably depends on the pedal torque induced at the measurement time. The rotation speed of the bottom bracket spindle, or the pedaling frequency, can be detected from the time interval between passage indicator devices on one of the two clearance-affected parts. Only after the passage indicator devices belonging to one set of passage indicator devices have passed by the detection device can a relative position of the clearance-affected parts with respect to one another be ascertained for that time period. An ascertained time interval, or a difference between time intervals, can be compared with a threshold value in order to identify whether the clearance-affected parts are in the idle position or are deflected out of that position.

In one embodiment of the method, the drive motor delivers no drive power if the result of ascertaining the relative position of the clearance-affected parts is that they are in the idle position. In particular, the motor current of the drive motor is shut off in this context. Drive energy can nevertheless be delivered or received to a certain extent by the drive motor as a result of residual rotational energy or possible magnetic effects in the drive motor; by definition, this is not intended to be categorized as a delivery of drive power for purposes of this embodiment.

In a further embodiment of the method, one of the methods described above is executed multiple times in the course of one revolution of the bottom bracket spindle. The change in the pedal-induced torque over one bottom bracket spindle revolution can thereby be detected. The more sets of passage indicator devices that are disposed on the clearance-affected parts, the more precisely this can be done. If the return device produces a linear correlation between the deflection out of the idle position and the pedal-induced torque in the bottom bracket spindle, the pedal-induced torque can be inferred linearly from the relative position of the clearance-affected parts. For this purpose, movement within the clearance is in particular low-friction, i.e., the frictional forces or torques are comparatively small with respect to the return forces or torques. Preferably what is measured over one revolution of the bottom bracket spindle is at least approximately a sine function, which is generated by the geometry of the crank drive in conjunction with the rider's pedal forces. In a variant, this allows pedaling uniformity to be assessed, maximum or minimum driving forces to be ascertained, and so forth.

BRIEF DESCRIPTION OF THE DRAWINGS

Preferred exemplifying embodiments of the present invention will be described in detail below with reference to the figures.

DETAILED DESCRIPTION OF EXAMPLE EMBODIMENTS

Figure 1:
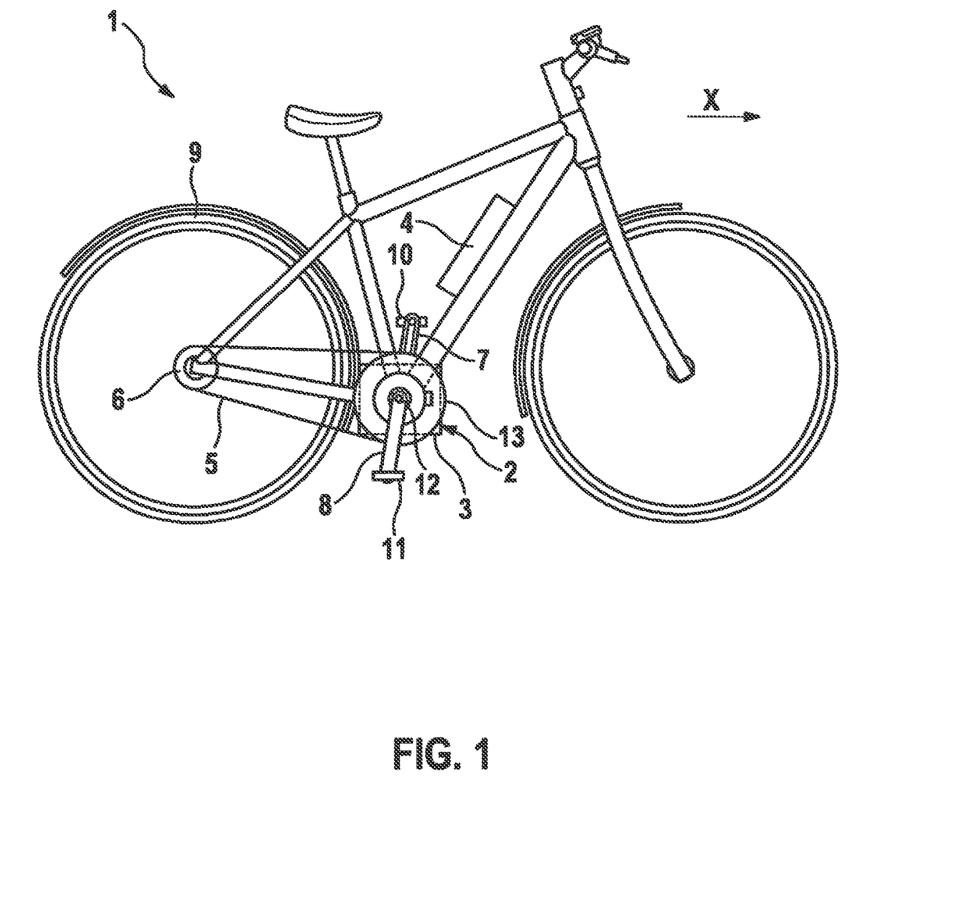
FIG. 1 is a schematic view of an electric bicycle in an embodiment of the invention.

An electric bicycle 1 in accordance with an embodiment of the present invention will be described in detail below with reference to FIG. 1. Electric bicycle 1 encompasses a crank drive 2 and an electric drive motor 3 that is disposed in the region of crank drive 2. Crank drive 2 encompasses two cranks 7 and 8, two pedals 10 and 11 that are mounted on the cranks, a bottom bracket spindle 12 on which cranks 7 and 8 are mounted, and a chainring 13 that is mounted on bottom bracket spindle 12 and rotates with it. A drive mechanism also encompasses chainring 13, a chain 5, and at least one sprocket 6 that is disposed on a rear wheel 9.

Electric drive system 3 is supplied with current from a battery. Electric drive system 3 encompasses a drive motor.

Figure 2:
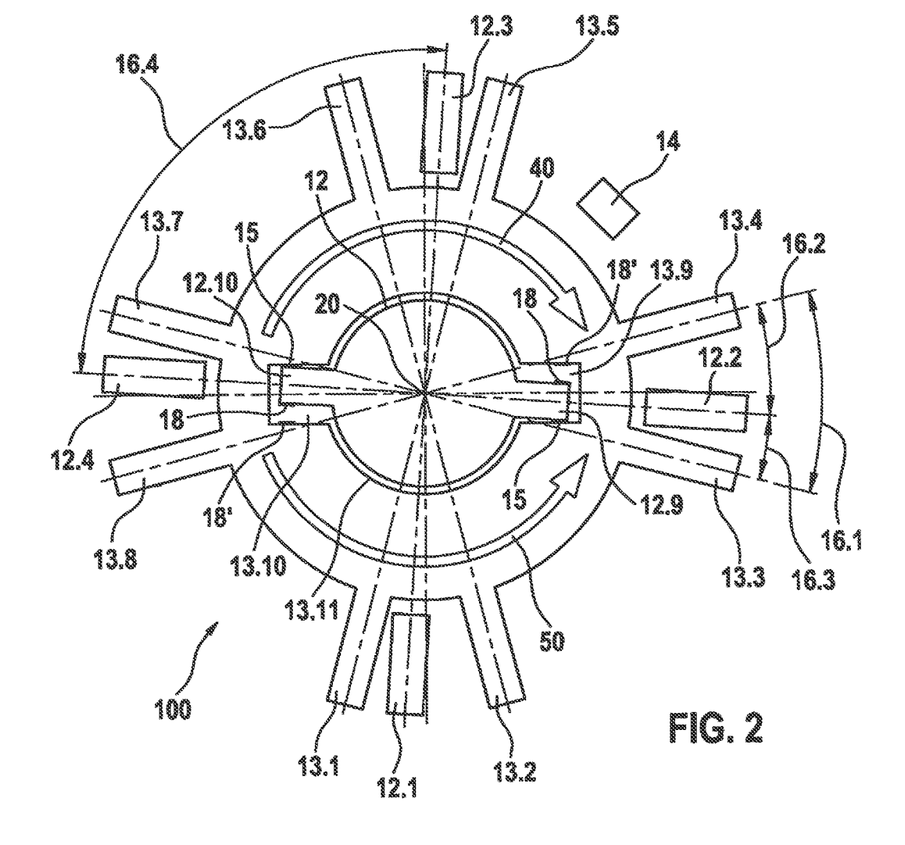
FIG. 2 schematically depicts a bottom bracket spindle and a portion of a chainring of the electric bicycle.

FIG. 2 schematically shows a torque detection device 100 of the drive system according to the present invention. Torque detection device 100 encompasses bottom bracket spindle 12, which carries two projections 12.9 and 12.10 on its outer periphery. Torque detection device 100 further encompasses chainring 13, which has an aperture 13.11 in which bottom bracket spindle 12 is inserted. Projections 12.9 and 12.10 of bottom bracket spindle 12 are disposed in aperture segments 13.9 and 13.10 at the edge of aperture 13.11. Surface segments of bottom bracket spindle 12 and of aperture 13.4 of chainring 13 which are not respectively part of projections 12.9 and 12.10 or of aperture segments 13.9 and 13.10 preferably each have a circular cross section. The diameters of the circular cross section at bottom bracket spindle 12 and at aperture 13.11 of the chainring do not differ greatly from one another. Preferably chainring 13 and bottom bracket spindle 12 exhibit a low-friction or low-wear material pairing with respect to one another.

Chainring 13 has eight passage indicator devices 13.1 to 13.8. Four passage indicator devices 12.1 to 12.4 are connected nonrotatably to bottom bracket spindle 12. These are located radially in approximately a similar position to passage indicator devices 13.1 to 13.8 of chainring 13. One of passage indicator devices 12.1 to 12.4 and two passage indicator devices 13.1 to 13.8 respectively form together a set of passage indicator devices that are disposed spatially in the vicinity of one another. Each two of passage indicator devices 13.1 to 13.8 of chainring 13 respectively surround one of passage indicator devices 12.1 to 12.4 of bottom bracket spindle 12 in a circumferential direction respectively of bottom bracket spindle 12 and of chainring 13.

Torque detection device 100, furthermore, has a detection device 14 with which a passage or sweep of a respective passage indicator device 12.1 to 12.4 or 13.1 to 13.8 past detection device 14 is detectable. While bottom bracket spindle 12 and chainring 13 rotate together, detection device 14 is stationary and is, for example, mounted on a frame of the electric bicycle. Within a set of respective passage indicator devices 12.1 to 12.4 and 13.1 to 13.8, passage indicator devices 12.1 to 12.4 of bottom bracket spindle 12 are at a respective first angular distance 16.2 from a first of passage indicator devices 13.1, 13.3, 13.5, and 13.7, and at a respective second angular distance and 16.3 from a second of rotation angle indicator devices 13.2, 13.4, 13.6, and 13.8. In each of the sets of rotation angle indicator devices 12.1 to 12.4 and 13.1 to 13.8, the sum of the angular distances 16.2 and 16.3 corresponds respectively to an angular distance between the pairs of rotation angle indicator devices 13.1 and 13.2, 13.3 and 13.4, 13.5 and 13.6, and 13.7 and 13.8 of the sets of rotation angle indicator devices 12.1 to 12.4 and 13.1 to 13.8. Based on a ratio of or a difference between angular distances 16.2 and 16.3, it is possible to deduce the relative position in which the clearance-affected parts (bottom bracket spindle 12 and chainring 13) are located with respect to one another, in particular whether they are in the idle position or in an end stop position.

In FIG. 2 the clearance-affected parts are in an end stop position. Bottom bracket spindle 12 is exerting a torque 50 on chainring 13 so that projections 12.9 and 12.0 are respectively in contact in aperture segments 13.9 and 13.10 against end stop regions 15. The torque of bottom bracket spindle 12 is transferred at these points to chainring 13. Bottom bracket spindle 12 and chainring 13 are thus in an end stop position. As a result, the angular distance 16.3 is smaller than the angular distance 16.2.

Torque 50 is counteracted by a torque 40 from a return device (not depicted). When the rider stops pedaling, torque 50 then disappears, and return torque 40 causes bottom bracket spindle 12 and chainring 13 to move relative to one another into the idle position. In the idle position, contact regions 18, located opposite end stop regions 15, of projections 12.9 and 12.10 abut internally against contact regions 18' of aperture segments 13.9 and 13.10 of aperture 13.11 of chainring 13. In FIG. 2, bottom bracket spindle 12 would be rotated counter-clockwise, in comparison with the end stop position depicted, in the idle position as far as the opposite end stop of the clearance. Angular distance 16.2 would then be smaller than angular distance 16.3, with the result that the idle position could be distinguished from the end stop position.

Figure 3:
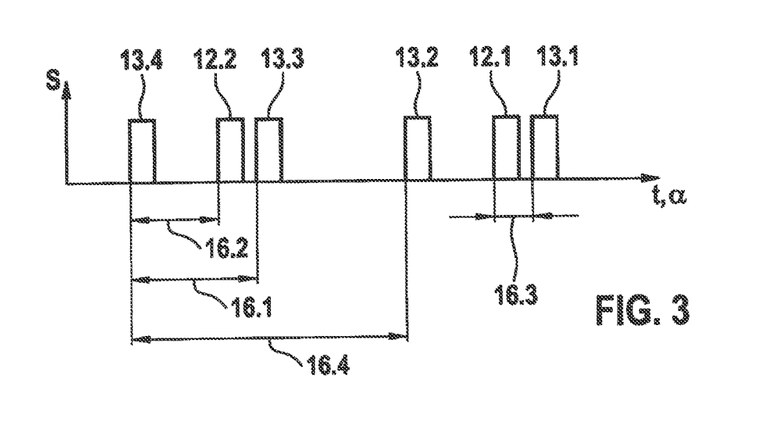
FIG. 3 schematically depicts passages of passage indicator devices in front of a detection device.

FIG. 3 schematically depicts a signal of detection device 14 which exhibits a signal profile S during which two sets of passage indicator devices 12.1 to 12.4 and 13.1 to 13.8 pass by detection device 14. Signal profile S is plotted against time t or against the rotation angle α of bottom bracket spindle 12 or of chainring 13. The reference numbers of the relevant passage indicator devices 12.1, 12.2, and 13.1 to 13.4 are associated with the signal peaks. The signal profile depicted would result at detection device 14 if, in the situation shown in FIG. 2, bottom bracket spindle 12 and chainring 13 were to rotate half a revolution counter-clockwise. The time intervals or angular distances between the signal peaks correspond to angular distances 16.1 to 16.4. With distance 16.1 in comparison to distance 16.3 it is possible to ascertain whether bottom bracket spindle 12 and chainring 13 are in the idle position or in the end stop position. The rotation speed of the bottom bracket spindle, or the pedaling frequency, can be ascertained by way of the time interval or angular distance 16.4. Angular distance 16.4 in FIG. 3 is associated with the distances of the two passage indicator devices 13.2 and 13.4 of chainring 13, the same distance 16.4 also occurring in FIG. 2, for example, between the two passage indicator devices 12.3 and 12.4 of the bottom bracket spindle. The time interval or angular distance 16.4 is also encountered again between signals that occupy the same position within a set of passage indicator devices 12.1 to 12.4 and 13.4 to 13.8.

Figure 4:
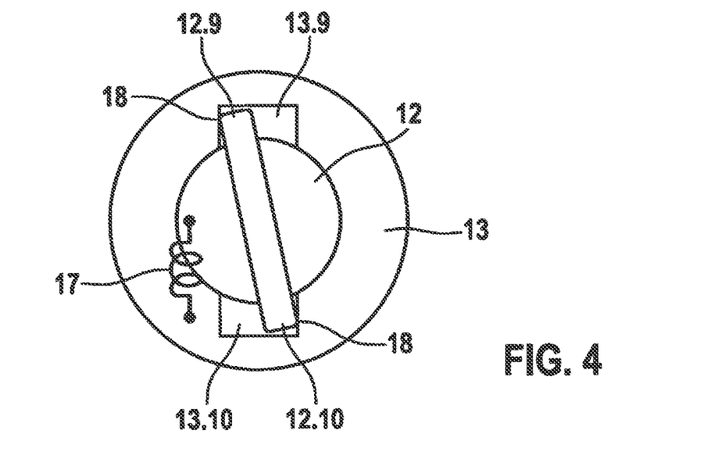
FIG. 4 schematically depicts the manner of operation of a return device.

FIG. 4 schematically shows the manner of operation of a return device that is implemented with a spring 17 that is mounted on bottom bracket spindle 12 and on chainring 13 in such a way that it moves bottom bracket spindle 12 and chainring 13 in an idle position. In the idle position, projections 12.9 and 12.10 abut respectively at a contact point 18 in the interior of aperture segment 13.9, 13.10. The idle position is one terminal position in the clearance between bottom bracket spindle 12 and chainring 13. When a pedal torque acts on bottom bracket spindle 12, spring 17 becomes deflected and projections 12.9 and 12.10 are moved away from contact points 18. Depending on the strength of spring 17 with reference to the pedal forces, either the end stop position—which is located at the other end of the clearance between bottom bracket spindle 12 and chainring 13—can already be reached with relatively low pedal forces; or it can be designed so that deflection out of the idle position over a wider range of possible pedal torques results in a deflection as proportionally as possible out of the idle position, while not already reaching the end stop position at low pedal torques.

Figure 5:
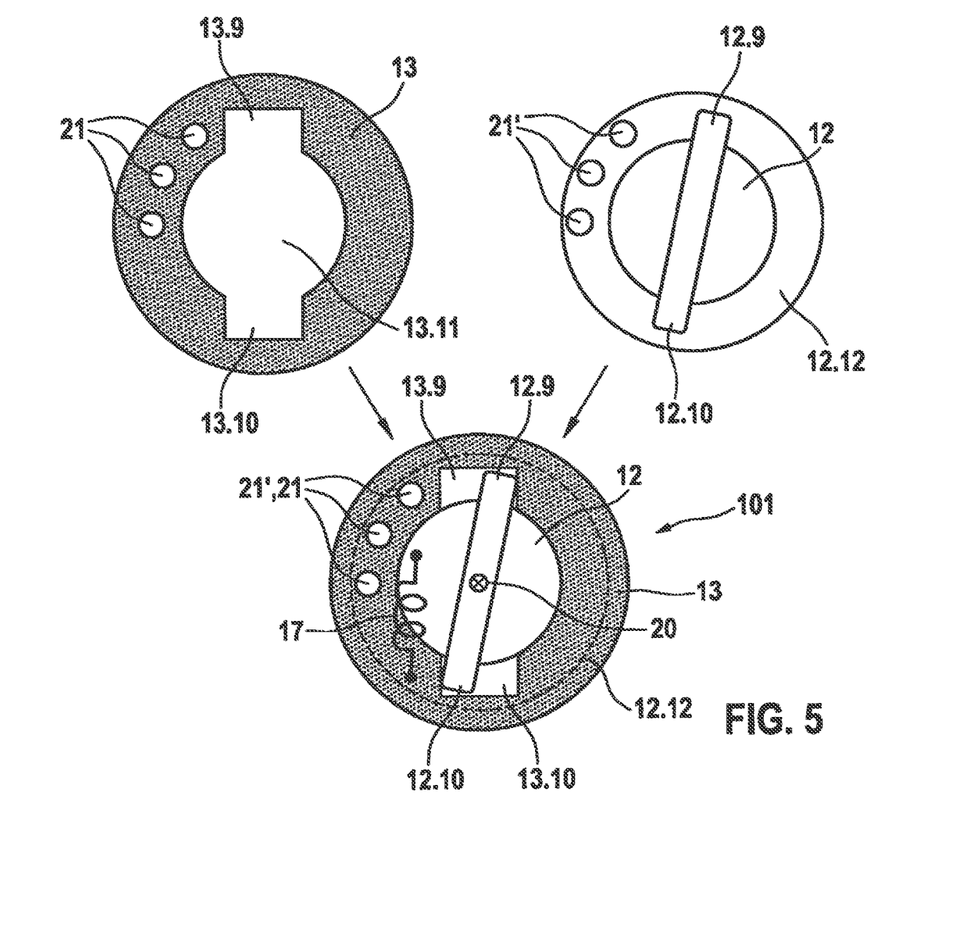
FIG. 5 schematically depicts the embodiment of the drive system and its assembly, in a first variant.

FIG. 5 schematically shows a variant of torque detection device 101 which operates on an optical basis. The passage indicator devices of bottom bracket spindle 12 and of chainring 13 are respectively implemented as apertures 21, 21'. In the embodiment shown in FIG. 5, apertures 21, 21' are configured as circular holes; apertures having a different shape are, however, possible in another embodiment. In particular, the apertures do not need to be holes enclosed on all sides, but instead can be located at the edge of a component. In the exemplifying embodiment shown in FIG. 5, apertures 21 are introduced into chainring 13. Bottom bracket spindle 12 encompasses a disk 12.12 that surrounds the bottom bracket spindle in a radial direction and has three apertures 21' embodied as circular holes. Apertures 21' extend in an axial direction of bottom bracket spindle 12. Apertures 21 in chainring 13 likewise extend in an axial direction. FIG. 5 shows how bottom bracket spindle 12 and chainring 13 are assembled into a composite element that is depicted at the bottom of FIG. 5. Projections 12.9 and 12.10 of bottom bracket spindle 12 are inserted into aperture segments 13.9 and 13.10. Also disposed in the composite element is a return spring 17, as discussed with reference to FIG. 4. Apertures 21, 21' of bottom bracket spindle 12 and of chainring 13 are at least substantially at the same radial distance from a theoretical rotation axis 20 of bottom bracket spindle 12. Apertures 21, 21' can thus overlap, so that light can be incident through the mutually overlapping apertures. In a variant that is not depicted, further apertures 21, 21' can be disposed over at least approximately the entire circumference of bottom bracket spindle 12 and chainring 13. Apertures 21, 21' of bottom bracket spindle 12 preferably have the same shape as aperture 21 of chainring 13.

Figure 6:
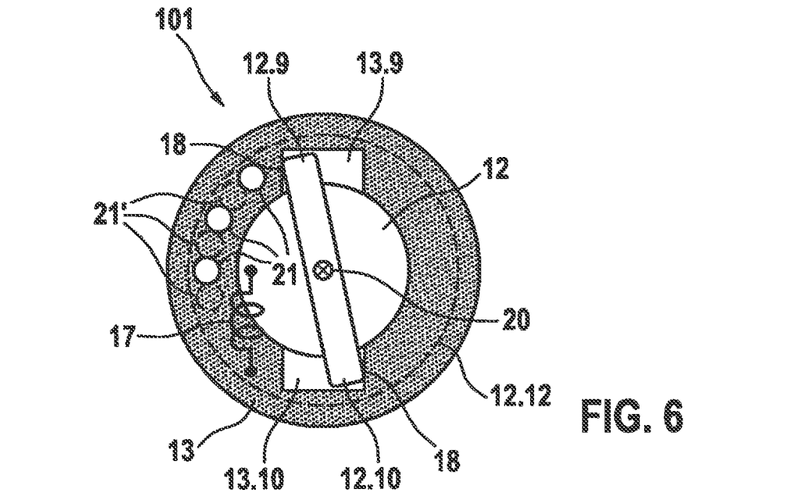
FIG. 6 schematically depicts the first variant of the embodiment in an idle position.

FIG. 6 shows the composite element of FIG. 5 in the idle position of the parts affected by rotational clearance, in which projections 12.9 and 12.10 are respectively abutted at a contact point 18 against the inner contour of aperture segment 13.9 and 13.10. The idle position is a terminal position of the clearance between bottom bracket spindle 12 and chainring 13. Apertures 21, 21' of bottom bracket spindle 12 and of chainring 13 do not overlap, so that at the radius of bottom bracket spindle 12 around the theoretical rotation axis 20 at which apertures 21' are located, no light can pass through bottom bracket spindle 12 and chainring 13. This can be detected by way of a detection device 14 (not depicted) that is disposed at the radius of apertures 21' around the theoretical rotation axis 20 of bottom bracket spindle 12. Detection device 14 can detect light and preferably emit light. When detection device 14 recognizes that no light can penetrate through bottom bracket spindle 12 and chainring 13, it can be inferred that bottom bracket spindle 12 and chainring 13 are in the idle position with respect to one another. The association between the idle position and a specific optical constellation of the apertures can also be defined differently by modifying the positions of the apertures in a circumferential direction.

Figure 7:
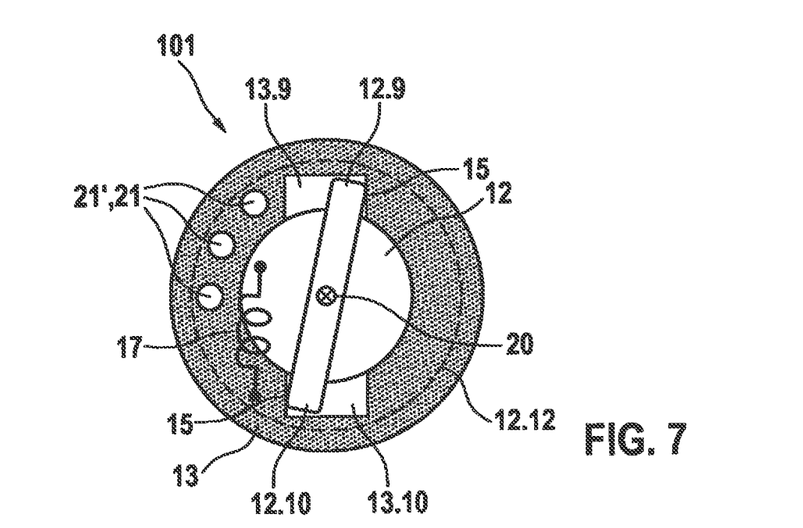
FIG. 7 schematically depicts the first variant of the embodiment in an end stop position.

FIG. 7 schematically shows the composite element of FIG. 5 with bottom bracket spindle 12 in an end stop position with reference to chainring 13, these being affected by a mutual rotational clearance. In this terminal position of the rotational clearance, projections 12.9 and 12.10 abut against end stop points 15 on the inner contour of aperture segments 13.9 and 13.10. Apertures 21 of bottom bracket spindle 12 and of chainring 13 overlap one another, so that light can pass through bottom bracket spindle 12 and through chainring 13 at the location of apertures 21, 21'. If a detection device 14 detects that light can pass through apertures 21, 21', the end stop position of the clearance-affected parts with respect to one another can be inferred. Such detection and inference can be carried out at each passage of an aperture 21, 21' in front of detection device 14. The placement of a plurality of apertures 21, 21' respectively along the periphery of bottom bracket spindle 12 and of chainring 13 allows frequent detection and thus faster recognition of changes in the relative position of the clearance-affected parts. The distance between apertures 21, 21' in a radial direction is preferably at least as large as the dimension of apertures 21, 21' in a circumferential direction. Preferably a partial overlap of apertures 21, 21' of bottom bracket spindle 12 and of chainring 13 can also be detected with detection device 14. Intermediate positions between the idle position and the end stop position can then also be detected.

Figure 8:
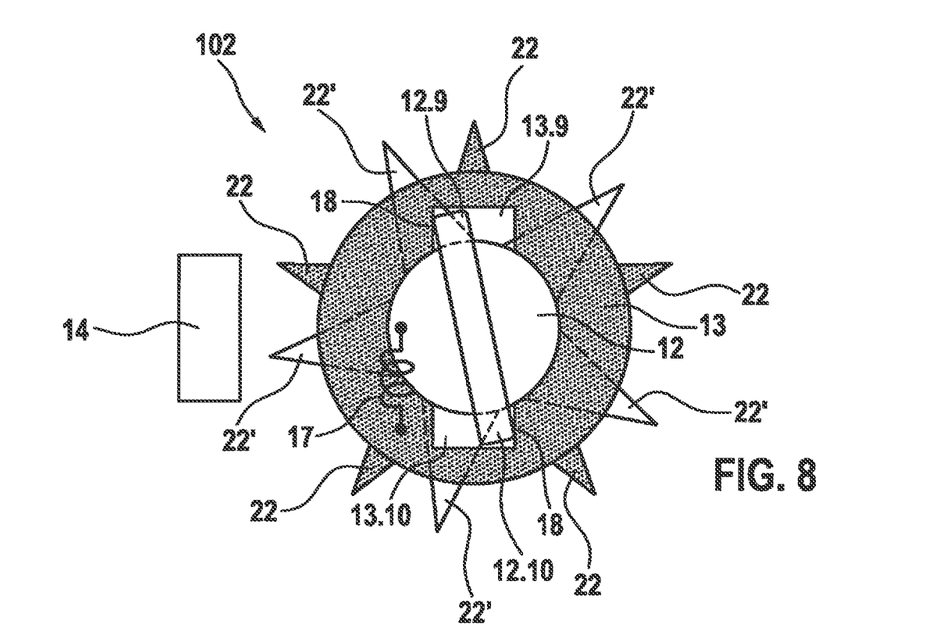
FIG. 8 schematically depicts a second variant of the embodiment in an idle position.

FIG. 8 schematically shows a second variant of torque detection device 102. Detection of the relative position of the clearance-affected parts is accomplished magnetically by way of a magnetic detection device 14. Passage indicator devices 22, 22' are embodied as magnetically effective projections (star-shaped teeth) on bottom bracket spindle 12 and on chainring 13. In FIG. 8, torque detection device 102 is in the idle position. The geometry of bottom bracket spindle 12 and chainring 13 which enables the clearance corresponds to the geometry shown in FIGS. 5 to 7, and is not separately described here again. Identical features bear the same reference characters. In the idle position, passage indicator devices 22' of bottom bracket spindle 12 have a different angular position than passage indicator devices 22 of chainring 13. They thus pass by detection device 14 one after another. Two signals, which follow another in time or with reference to the rotation angle of bottom bracket spindle 12, occur.

Figure 9:
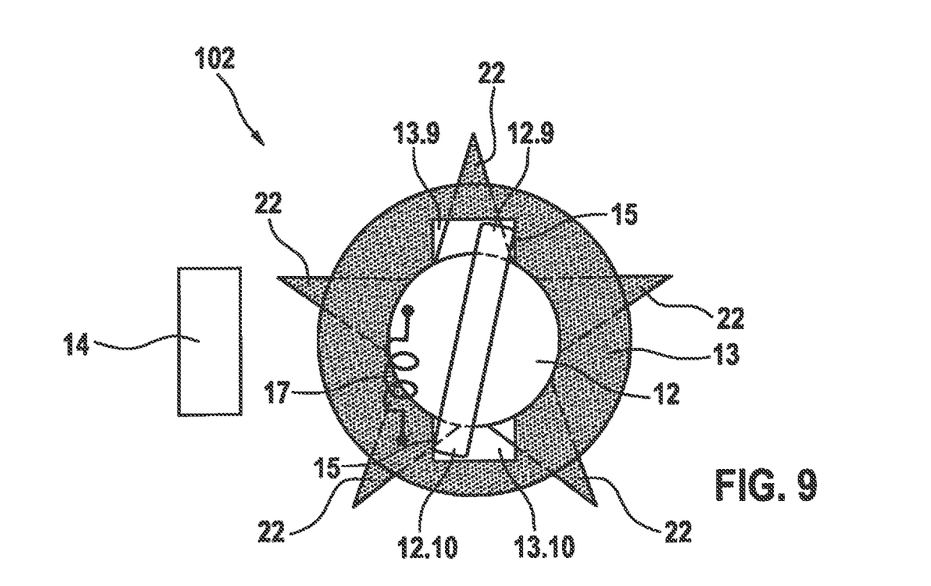
FIG. 9 schematically depicts the second variant of the embodiment in an end stop position.

FIG. 9 shows torque detection device 102 of FIG. 8 in the end stop position. In the end stop position, passage indicator devices 22, 22' of bottom bracket spindle 12 and of chainring 13 are superimposed on one another, so that they sweep together past detection device 14 and are detected as a combined signal. From the information as to whether a single superimposed signal, or two individual signals with a spacing in terms of time or distance, are detected, it is possible to deduce whether the clearance-affected parts are in the idle position or in the end stop position. An intermediate position between the idle position and the end stop position can be recognized by way of the distance in terms of time or angle between a signal of bottom bracket spindle 12 and a signal of chainring 13. In a variant, two separate detection devices can be provided for the passage indicator devices 22 of bottom bracket spindle 12 and of chainring 13.

What is claimed is:

1. A drive system for a pedal-operable vehicle, comprising:
    a drive motor with which a drive force for the vehicle is generatable;
    pedals on pedal arms;
    a bottom bracket spindle on which the pedal arms are mounted;
    a drive mechanism for transferring drive energy from the bottom bracket spindle to a wheel of the vehicle, a clearance existing in a transfer path of drive energy between a pedal arm and a chainring, rotating with the bottom bracket spindle, of the drive mechanism; and
    a return device with which clearance-affected parts are transferable, at or below an idle pedal force within their clearance with respect to one another, into an idle position in which the clearance-affected parts assume at least approximately a predefined relative position with respect to one another, the clearance-affected parts being removable, within the clearance, from the idle position by way of pedal force above the idle pedal force against the action of the return device, and information as to whether the clearance-affected parts are in an idle position being furnishable in a form of at least one electrical signal, wherein the clearance-affected parts are the bottom bracket spindle and the chainring, and wherein drive system is configured such that the drive motor delivers no drive energy for the vehicle and is switched off when in response to the clearance-affected parts being in the idle position.

2. The drive system as recited in claim 1, wherein above an end stop pedal force with reference to one another, the clearance-affected parts are transferable into an end stop position in which the clearance-affected parts are in contact against respective end stop regions, information as to whether the clearance-affected parts are in the end stop position being furnishable in a form of at least one electrical signal.

3. The drive system as recited in claim 1, wherein the drive motor is switched off after half a revolution of the bottom bracket spindle after the idle position is entered into.

4. The drive system as recited in claim 2, wherein at least one of the idle position, the end stop position, or an intermediate position between the idle position and the end stop position, is detectable by way of a detection device not rotating with the bottom bracket spindle during rotation of the bottom bracket spindle, by the fact that a passage time of a passage indicator device of each of the clearance-affected parts is detectable with the detection device.

5. The drive system as recited in claim 4, wherein one of the clearance-affected parts has two passage indicator devices that are both spatially associated with one passage indicator device of the other clearance-affected part.

6. The drive system as recited in claim 5, wherein in the idle position, an angular distance around the bottom bracket spindle (rotation axis of the bottom bracket spindle), between one of the two passage indicator devices of one of the clearance-affected parts and the passage indicator device of the other clearance-affected part, and an angular distance (rotation axis of the bottom bracket spindle) between the other of the two passage indicator devices of the one of the clearance-affected parts and the same passage indicator device of the other clearance-affected part, are at least approximately of the same size.

7. The drive system as recited in claim 6, wherein the clearance-affected parts have more than one set of passage indicator devices that are configured to detect at least one of the idle position, the end stop position, or an intermediate position of the clearance-affected parts, the angular distances of sets of passage indicator devices with respect to one another being of equal size with reference to the rotation axis of the bottom bracket spindle.

8. A method for detecting a drive state, with reference to a pedal drive, of a pedal-operable vehicle having a drive system including a drive motor with which a drive force for the vehicle is generatable, pedals on pedal arms, a bottom bracket spindle on which the pedal arms are mounted, a drive mechanism for transferring drive energy from the bottom bracket spindle to a wheel of the vehicle, a clearance existing in a transfer path of drive energy between a pedal arm and a chainring, rotating with the bottom bracket spindle, of the drive mechanism, and a return device with which clearance-affected parts are transferable, at or below an idle pedal force within their clearance with respect to one another, into an idle position in which the clearance-affected parts assume at least approximately a predefined relative position with respect to one another, the clearance-affected parts being removable, within the clearance, from the idle position by way of a pedal force, applied via at least one of the pedals, above the idle pedal force against the action of the return device, and information as to whether the clearance-affected parts are in an idle position being furnishable in a form of at least one electrical signal, wherein the clearance-affected parts are the bottom bracket spindle and the chainring, and wherein the drive motor delivers no drive energy for the vehicle and is switched off in response to the clearance-affected parts being in the idle position, the method comprising:
    detecting a relative position of the clearance-affected parts with a detection device by the fact that a time interval between a passage time of a respective passage indicator device of one of the respective clearance-affected parts and a passage time of a respective passage indicator device of the other of the respective clearance-affected parts, is ascertained at the detection device, wherein the drive motor delivers at least approximately no drive power and is switched off in response to it is ascertained that the clearance-affected parts are in the idle position with respect to one another.

9. The method as recited in claim 8, wherein in a pedaling mode of the vehicle, a change over time in pedaling torque is detected over at least a portion of a revolution of the bottom bracket spindle by repeatedly carrying out the detecting the relative position step.

* * * * *